C. W. TIFT & R. L. COBB.
Fastenings for Railway Rail-Joints.
No. 149,002.
Patented March 24, 1874.
Fig. 1
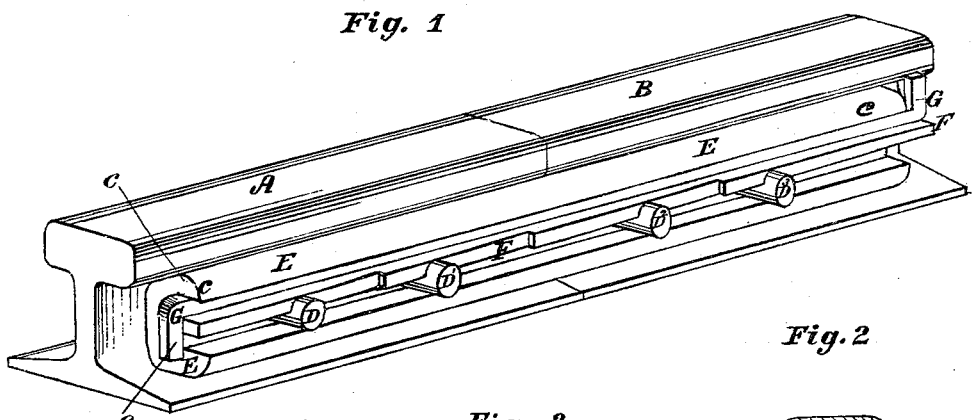
Fig. 2
Fig. 3.
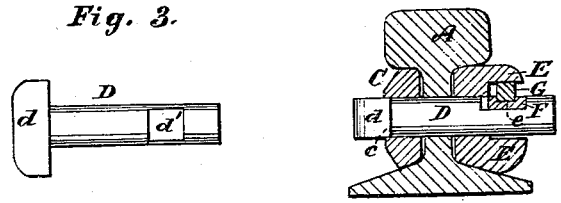
Fig. 4.
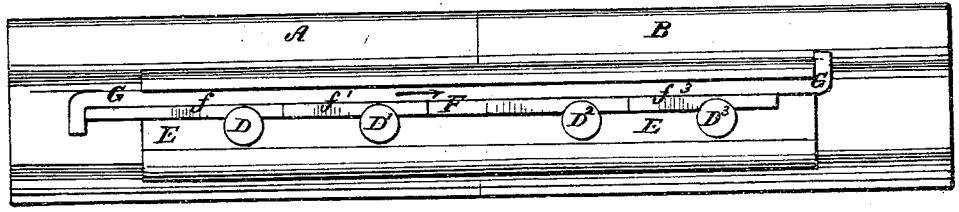
Fig. 5
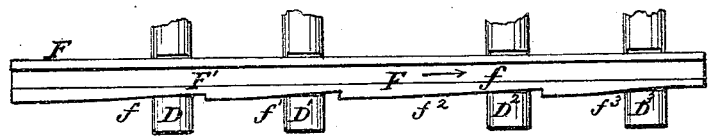
Witnesses:—
W. C. Davidson
C. C. Poole
Chas. W. Tift and R. L. Cobb.
by their Atty.
Wm. H. Rowe

UNITED STATES PATENT OFFICE.

CHARLES W. TIFT AND ROBERT L. COBB, OF MEMPHIS, TENNESSEE.

IMPROVEMENT IN FASTENINGS FOR RAILWAY-RAIL JOINTS.

Specification forming part of Letters Patent No. 148,002, dated March 24, 1874; application filed February 18, 1873.

*To all whom it may concern:*

Be it known that we, CHARLES W. TIFT and ROBERT L. COBB, both of Memphis, in the county of Shelby and State of Tennessee, have invented certain new and useful Improvements in Bolt-Locks for Track-Rails, of which the following is a specification:

Our invention relates to devices for securing together the adjacent ends of railroad-rails, so as to form a firm joint; and its object is to provide a fastening which may readily be removed, replaced, or tightened without liability to wear loose from the jar or concussion of passing trains.

The subject-matter claimed is hereinafter specified.

In the accompanying drawings, which show our improvements as embodied in the best way now known to us, Figure 1 represents a view in perspective of our improved device; Fig. 2, a vertical transverse section of the same; Fig. 3, a view of one of the bolts; Fig. 4, a side elevation of the complete device; and Fig. 5, a view of the wedge-bar.

The adjacent ends of the rails A and B are united by fish-plates E E' overlapping said joints and by bolts D. The heads of these bolts fit into correspondingly-shaped recesses in one of the fish-plates to keep the bolts from turning. The shanks of these bolts project through the other fish-plate, and are each provided with a notch, in which a plate or wedge-bar, F, loosely fits. This bar is provided with a series of ratchets or inclines which act upon the fish-plate and the shoulders of the notches in the bolts to tighten them all simultaneously. A locking-rod, G, of any desired cross-section, and, by preference, of wrought metal, is formed with a flanged or bent head, g, at one end, which overlaps the end of the wedge-bar. This locking-bar lies between the upper side of the wedge-bar and a projecting lip or flange, c, on the fish-plate E.

The operation of our device will readily be understood. The notched bolts pass through the usual slots in the rails and fish-plates, their heads fitting in the recesses in the plates C to retain them in position. The wedge-bar is then inserted in the notches of the bolts with the locking-bar above it. A blow with a hammer on the head of the locking-bar simultaneously forces said bar and the wedge-bar forward, thus clamping the fish-plates tightly on the rails. The parts are then securely locked in this position by bending or upsetting the other end of the locking-bolt over the lip of the fish-plate. Should the joint ever work loose it may be tightened up by repeating the operation above described.

We do not broadly claim locking a fish-plate to a rail by means of a wedge; but we are not aware of the existence of any device for simultaneously locking a series of bolts by a ratchet-shaped wedge-bar combined with a locking-bar, as hereinbefore set forth.

We claim—

1. In a track-rail joint, the combination of the rails, the fish-plates, the transversely-notched bolts passing therethrough, the ratchet-shaped wedge-bar, and the locking-rod, all these members being constructed and operating substantially as and for the purpose set forth.

2. The combination of the ratchet-shaped wedge-bar, the flanged fish-plate, and the locking-rod interposed between the two and overlapping the wedge-bar at one end and the lip of the fish-plate at the other, for the purposes specified.

CHAS. W. TIFT.
R. L. COBB.

Witnesses as to CHAS. W. TIFT:
   WM. H. EVANS,
   WM. L. MAURY.
Witnesses as to R. L. COBB:
   WM. M. DANIEL,
   H. H. POSTEN.